(No Model.)  2 Sheets—Sheet 1.
F. STROBEL.
GRAIN SEPARATOR.
No. 434,735. Patented Aug. 19, 1890.
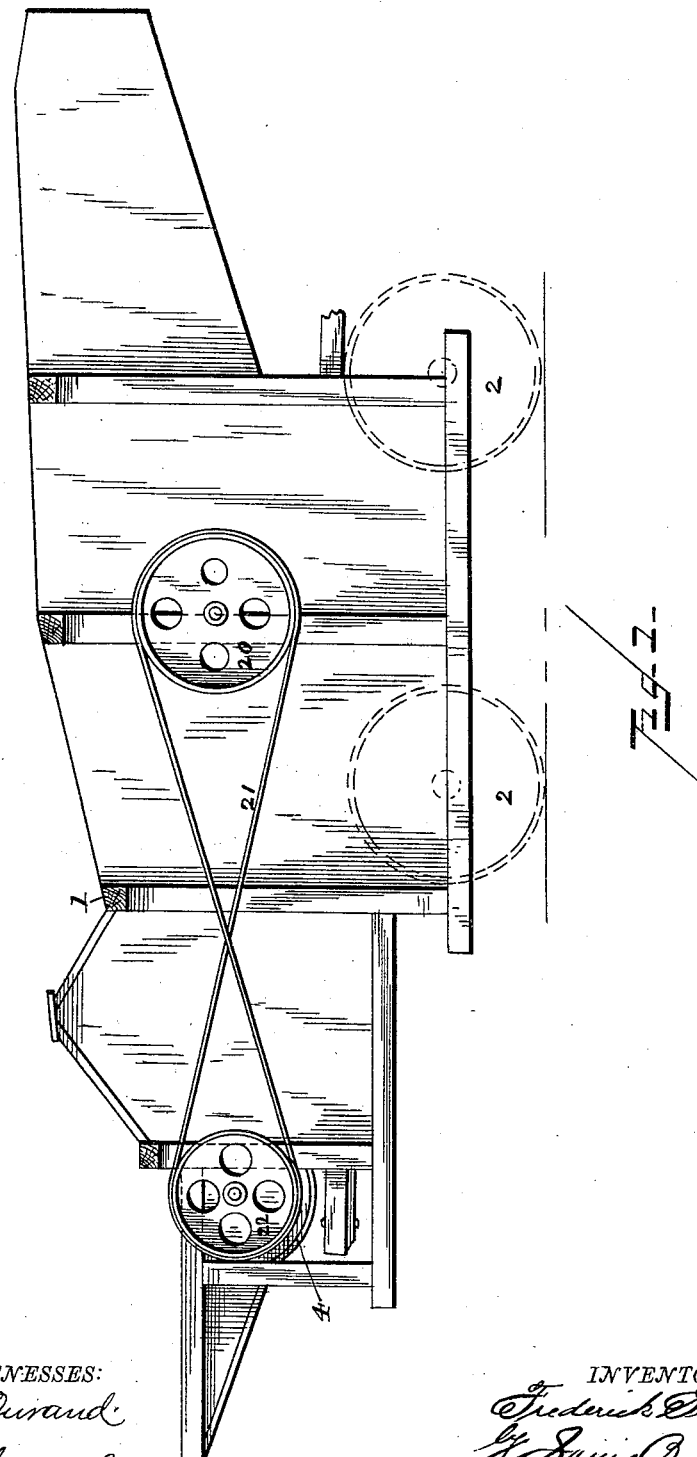
WITNESSES:
INVENTOR:
Frederick Strobel

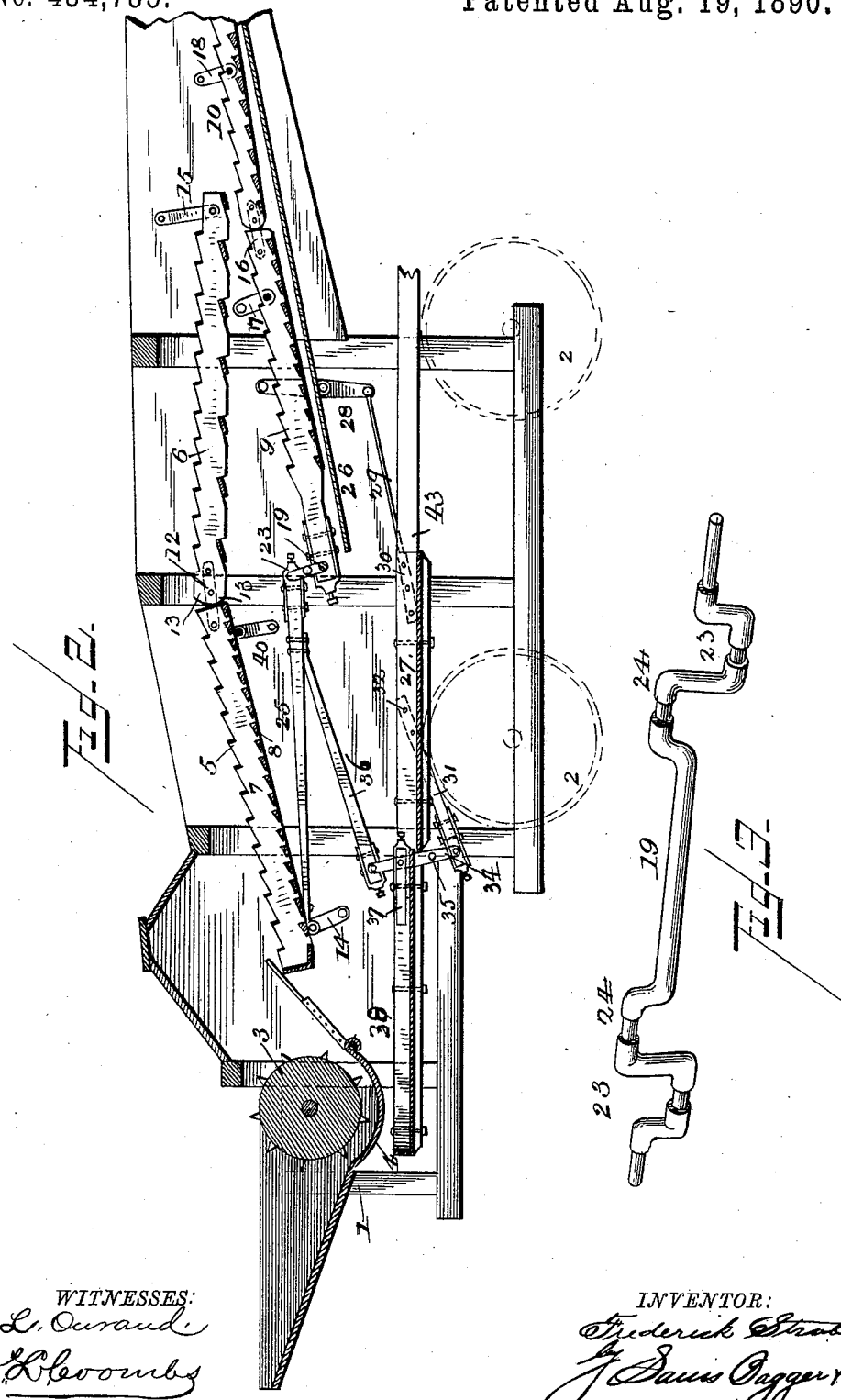

UNITED STATES PATENT OFFICE.

FREDERICK STROBEL, OF MARION, OHIO, ASSIGNOR TO THE MARION MANUFACTURING COMPANY, OF SAME PLACE.

GRAIN-SEPARATOR.

SPECIFICATION forming part of Letters Patent No. 434,735, dated August 19, 1890.

Application filed May 12, 1890. Serial No. 351,476. (No model.)

*To all whom it may concern:*

Be it known that I, FREDERICK STROBEL, a citizen of the United States, and a resident of Marion, in the county of Marion and State of Ohio, have invented certain new and useful Improvements in Grain-Separators; and I do hereby declare that the following is a full, clear, and exact description of the invention, which will enable others skilled in the art to which it appertains to make and use the same, reference being had to the accompanying drawings, which form a part of this specification.

My invention relates to improvements in grain-separators for thrashing-machines, the object being to provide an improved combination and arrangement of straw-carriers and grain-pans, whereby any grain which might otherwise be carried away with the straw from the thrashing-cylinder is saved.

It is also my object to provide improved means for oscillating and vibrating the straw-carriers and grain-pans for more effectually separating the grain from the straw and chaff.

The invention consists in the novel construction and combination of parts, hereinafter more fully described, and definitely pointed out in the claims.

In the accompanying drawings, Figure 1 represents a side elevation of a grain-separator constructed according to my invention. Fig. 2 is a central longitudinal section of the same. Fig. 3 is a perspective view of the double-cranked driving-shaft.

In the said drawings, the reference-numeral 1 designates the frame of the apparatus, 2 the supporting-wheels, and 3 the thrashing-cylinder provided with the usual concave 4. These parts may be of any ordinary construction.

5 and 6 designate straw-carriers having open-mesh or perforated bottoms. These straw-carriers are preferably constructed of the sides 7 and transverse slats 8 with intervals between. The slats 8 in carrier 5 are set very near together, the space between each being sufficient to allow the grain to drop down through into the receiving-pans below, but not allowing any of the straw to pass therethrough. The slats forming the bottom of carrier 6, however, are set farther apart, so as to allow the short straw, as well as any grain that may have been carried over from carrier 5, to fall through onto the supplemental carriers 9 and 10 below. Carriers 5 and 6 are connected together at their meeting ends by means of pivoted links 12, the ends of carrier 6 having the double bevels 13. The link 12 is rigidly secured to carrier 6 but pivotally connected with carrier 5.

The numeral 14 designates a short bar pivoted to the frame of the machine at its lower end, and at its upper end is pivotally connected with the carrier 5 near the front thereof. A similar depending bar 15 supports the rear end of carrier 6. Underneath the carriers 5 and 6 are the supplemental carriers similar in construction to carriers 5 and 6, being connected together by link 16, and are supported at their rear ends by the depending bars 17 and 18, pivoted thereto and to the frame of the apparatus.

The numeral 19 designates a driving-shaft journaled in frame 1, and provided with a pulley 20 on one or both ends connected by means of a belt 21 with a driving-pulley 22 on the shaft of the thrashing-cylinder. This shaft is provided with double cranks 23 and 24, set or arranged oppositely to each other, as seen in Fig. 3. Connected with crank 23 of this shaft is a pitman 25, the front end of which is connected with carrier 5, so that as said pitman is actuated by the rotation of the shaft the carriers 5 and 6 will be oscillated, feeding the straw to the rear of the machine, and also agitating it so as to separate the grain therefrom. The crank 24 is connected with carrier 9, so that a similar motion is imparted to it and the carrier 10. Beneath and secured to carriers 9 and 10 is an incline 26, by which the grain escaping from said carriers is conveyed to a grain pan or receiver 27.

28 designates a bar pivoted at its upper end to the frame of the machine and connected with the incline 26 so as to oscillate said incline. The lower end of this bar is connected with the horizontal bar 29, connected with grain-receiver 27 by means of the plate 30, secured thereto. Secured to the front of receiver 27 is the pitman 31 by means of bolts 32.

The numeral 34 designates a rock-arm pivoted to the machine at 35 and connected at its upper end to the pitman 36, secured to and moving with pitman 25. The lower end of this arm is pivotally connected with pitman 31, while intermediate of its pivotal point 35 and its upper end it is connected to arm 37, secured to grain-receiver 38.

40 designates a transverse supporting-bar secured to the sides of the casing upon which the rear end of carrier 5 rests.

The operation of the apparatus will be readily understood. Rotary motion being imparted to the driving-shaft by means of the pulleys and belt the crank 23 will actuate the pitman 25, which in turn will oscillate carriers 5 and 6, causing the straw to be carried to the rear of the apparatus, the grain from carrier 5 falling down into the grain-receivers below, while the grain and short straw from carrier 6 will fall onto the supplemental carriers 9 and 10, which are oscillated by means of crank 24, the grain therefrom falling onto the incline 26, from which it passes to grain-receiver 27, while the straw is delivered at the rear of the machine. The grain-receiver 27 is given a horizontally-reciprocating movement by the rock-arm 34 and pitman 31, while a similar movement is given to receiver 38 for the purpose of feeding the grain to the point of delivery at 43, and also agitating the grain to separate it from the chaff.

Having thus described my invention, what I claim is—

1. In a grain-separator, the combination, with the carriers 5 and 6, connected together, the supplemental connected carriers 9 and 10, and the double-cranked driving-shaft connected with carrier 9 and with a pitman connected with carrier 5, of the reciprocating grain-receivers, and the rock-arms connected therewith and with pitmen connected with the driving-shaft, substantially as described.

2. The combination, with the oscillating connected carriers 5 and 6, the supplemental connected carriers 9 and 10, the incline, the double-cranked driving-shaft connected with carrier 9, and the pitman connecting one of the cranks 23 and the carrier 5, of the grain-receivers 27 and 41, the rock-arm 34, pitmen 25 and 31, the connecting-bar 29, and the pivoted bar 28, connected with and actuating incline 26, substantially as described.

3. In a grain-separator, the combination of the carriers 5 and 6, connected together, the transverse bar 40, secured to the sides of the casing for supporting the rear end of carrier 5, the supplemental carriers 9 and 10, the double-cranked shaft connected with carrier 9 and with a pitman connected with carrier 5, the reciprocating grain-receivers, and the rock-arms connected therewith and with pitmen connected with the said shaft, substantially as described.

In testimony that I claim the foregoing as my own I have hereunto affixed my signature in presence of two witnesses.

FREDERICK STROBEL.

Witnesses:
JOHN JONES,
M. V. PAYNE.